(12) United States Patent
Naito et al.

(10) Patent No.: US 10,517,071 B2
(45) Date of Patent: *Dec. 24, 2019

(54) WIRELESS COMMUNICATION DEVICE, WIRELESS COMMUNICATION SYSTEM, WIRELESS COMMUNICATION METHOD AND PROGRAM

(71) Applicant: SONY CORPORATION, Tokyo (JP)

(72) Inventors: Masahiko Naito, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,724

(22) Filed: Jul. 25, 2018

(65) Prior Publication Data

US 2018/0332565 A1 Nov. 15, 2018

Related U.S. Application Data

(63) Continuation of application No. 13/780,997, filed on Feb. 28, 2013, now Pat. No. 10,070,415, which is a
(Continued)

(30) Foreign Application Priority Data

Apr. 8, 2009 (JP) ................ 2009-094369

(51) Int. Cl.
*H04W 72/02* (2009.01)
*H04W 8/00* (2009.01)
(Continued)

(52) U.S. Cl.
CPC .......... *H04W 72/02* (2013.01); *H04W 8/005* (2013.01); *H04W 72/0406* (2013.01); *H04W 84/18* (2013.01); *H04W 84/20* (2013.01)

(58) Field of Classification Search
CPC . H04W 72/02; H04W 72/0406; H04W 84/18; H04W 84/20; H04W 8/005
See application file for complete search history.

(56) References Cited

U.S. PATENT DOCUMENTS 5,659,545 A 8/1997 Sowles et al.
5,784,368 A 7/1998 Weigand et al.
(Continued)

FOREIGN PATENT DOCUMENTS

JP 2005-051522 A 2/2005
JP 2005-079985 A 3/2005
(Continued)

OTHER PUBLICATIONS

Apr. 9, 2013, Japanese Office Action issued for related application No. 2009-094369.
(Continued)

*Primary Examiner* — Dung B Huynh
(74) *Attorney, Agent, or Firm* — Paratus Law Group, PLLC

(57) ABSTRACT

Provided is a wireless communication device which includes a notification information transmitting unit for transmitting, via a wireless communication network, notification information of the wireless communication device, a notification information receiving unit for receiving notification information transmitted from another device, a frequency switching unit for successively switching, at random cycles, a frequency at which the notification information is transmitted or a frequency at which the notification information is received, and a transmission processing unit for performing a data transmission process after transmitting or receiving an acknowledgement to the notification information to/from such other device.

20 Claims, 6 Drawing Sheets

Related U.S. Application Data continuation of application No. 12/750,346, filed on Mar. 30, 2010, now abandoned.

(51) Int. Cl.
    *H04W 84/20* (2009.01)
    *H04W 72/04* (2009.01)
    *H04W 84/18* (2009.01)

(56) References Cited

U.S. PATENT DOCUMENTS

| | | |
|---|---|---|
| 5,850,525 A | 12/1998 | Kalkunte et al. |
| 5,948,102 A | 9/1999 | Wuidart |
| 6,205,153 B1 | 3/2001 | Shaffer et al. |
| 6,473,412 B1 | 10/2002 | Haartsen |
| 6,535,551 B1 | 3/2003 | Sweitzer et al. |
| 6,665,269 B1 | 12/2003 | Schmitz |
| 7,577,125 B2 | 8/2009 | Abhishek et al. |
| 7,580,393 B2 | 8/2009 | Wang et al. |
| 7,738,876 B1 | 6/2010 | Radhakrishnan et al. |
| 7,814,322 B2 | 10/2010 | Gurevich et al. |
| 7,865,196 B2 | 1/2011 | Stahl et al. |
| 8,018,882 B1* | 9/2011 | Chhabra ............... H04W 28/18 370/235 |
| 8,131,291 B2 | 3/2012 | Jeong et al. |
| 8,190,167 B2 | 5/2012 | Qi et al. |
| 8,428,079 B1* | 4/2013 | Lambert ............... H04W 8/005 370/461 |
| 8,570,898 B1* | 10/2013 | Kopikare ............. H04W 8/005 370/254 |
| 8,699,418 B2 | 4/2014 | Iyer et al. |
| 9,125,237 B2* | 9/2015 | Goto ................... H04L 43/12 |
| 2002/0037715 A1 | 3/2002 | Mauney et al. |
| 2002/0181417 A1* | 12/2002 | Malhotra ............. H04W 72/02 370/329 |
| 2002/0181418 A1 | 12/2002 | Awater et al. |
| 2003/0012163 A1* | 1/2003 | Cafarelli .............. H04L 1/1607 370/338 |
| 2004/0103282 A1* | 5/2004 | Meier ................ G06Q 20/3674 713/171 |
| 2005/0052995 A1* | 3/2005 | Gu ..................... H04L 47/11 370/230 |
| 2005/0063334 A1 | 3/2005 | Fnu et al. |
| 2005/0085214 A1 | 4/2005 | Laroia et al. |
| 2005/0111477 A1 | 5/2005 | Ghanma et al. |
| 2005/0152290 A1 | 7/2005 | Sakusabe |
| 2005/0174950 A1 | 8/2005 | Ayyagari |
| 2005/0192016 A1 | 9/2005 | Zimmermann et al. |
| 2005/0281215 A1 | 12/2005 | Budampati et al. |
| 2005/0286480 A1* | 12/2005 | Akiyama ............. H04W 76/10 370/338 |
| 2006/0040663 A1 | 2/2006 | Ise et al. |
| 2006/0045033 A1 | 3/2006 | Fukuhara |
| 2006/0092888 A1 | 5/2006 | Jeong et al. |
| 2006/0104333 A1 | 5/2006 | Rainbolt et al. |
| 2006/0142034 A1* | 6/2006 | Wentink .............. H04W 8/005 455/515 |
| 2006/0171388 A1 | 8/2006 | Ikeda |
| 2006/0176870 A1* | 8/2006 | Joshi ................... H04W 88/06 370/345 |
| 2006/0203784 A1 | 9/2006 | Cromer et al. |
| 2006/0233142 A1 | 10/2006 | Iwamura |
| 2006/0239208 A1 | 10/2006 | Roberts et al. |
| 2006/0251098 A1 | 11/2006 | Morioka |
| 2006/0262733 A1 | 11/2006 | Guo et al. |
| 2006/0268804 A1* | 11/2006 | Kim .................... H04W 48/12 370/338 |
| 2006/0274776 A1 | 12/2006 | Malik et al. |
| 2006/0285507 A1 | 12/2006 | Kinder et al. |
| 2007/0076682 A1* | 4/2007 | Kim ................. H04W 74/0833 370/349 |
| 2007/0171910 A1* | 7/2007 | Kumar ............... H04L 63/0428 370/392 |
| 2007/0177549 A1 | 8/2007 | Lo et al. |
| 2007/0189249 A1* | 8/2007 | Gurevich ............ H04L 45/20 370/338 |
| 2007/0225044 A1 | 9/2007 | Law et al. |
| 2007/0237121 A1 | 10/2007 | Khandelwal et al. |
| 2007/0243892 A1 | 10/2007 | Mikami et al. |
| 2008/0002616 A1 | 1/2008 | Stahl et al. |
| 2008/0031208 A1* | 2/2008 | Abhishek .......... H04W 52/0225 370/338 |
| 2008/0112569 A1 | 5/2008 | Asada |
| 2008/0137634 A1 | 6/2008 | Hassan et al. |
| 2008/0150750 A1 | 6/2008 | Parris et al. |
| 2008/0159208 A1 | 7/2008 | Kloker et al. |
| 2008/0170520 A1* | 7/2008 | Sim .................... H04W 72/005 370/310 |
| 2008/0219285 A1 | 9/2008 | Key et al. |
| 2008/0232256 A1 | 9/2008 | Douglas et al. |
| 2008/0291883 A1* | 11/2008 | Seok .................. H04W 64/00 370/338 |
| 2008/0298333 A1 | 12/2008 | Seok |
| 2008/0298341 A1 | 12/2008 | Fujiwara et al. |
| 2009/0075653 A1* | 3/2009 | Yeom ................ H04W 72/02 455/434 |
| 2009/0086697 A1 | 4/2009 | Okada |
| 2009/0088605 A1 | 4/2009 | Ross et al. |
| 2009/0097451 A1 | 4/2009 | Gogic |
| 2009/0103501 A1 | 4/2009 | Farrag et al. |
| 2009/0154426 A1 | 6/2009 | Perraud et al. |
| 2009/0252127 A1 | 10/2009 | Rangarajan et al. |
| 2009/0323608 A1* | 12/2009 | Adachi ............... H04W 48/18 370/329 |
| 2010/0020770 A1 | 1/2010 | Qin et al. |
| 2010/0046585 A1 | 2/2010 | So et al. |
| 2010/0061325 A1 | 3/2010 | Moritomo |
| 2010/0110949 A1* | 5/2010 | Lundsgaard ........ H04W 48/16 370/311 |
| 2010/0124213 A1 | 5/2010 | Ise et al. |
| 2010/0148931 A1 | 6/2010 | Pappu et al. |
| 2010/0165913 A1 | 7/2010 | Ang et al. |
| 2010/0182925 A1 | 7/2010 | Nagata et al. |
| 2010/0195595 A1 | 8/2010 | Iwata |
| 2011/0161697 A1* | 6/2011 | Qi ..................... G06F 1/3209 713/320 |
| 2011/0280255 A1 | 11/2011 | DeSanti |
| 2011/0305227 A1* | 12/2011 | Heerboth ............ H04W 8/005 370/338 |
| 2012/0275490 A1 | 11/2012 | Courtice |
| 2013/0223361 A1 | 8/2013 | Park et al. |
| 2013/0232253 A1 | 9/2013 | Elhaddad et al. |

FOREIGN PATENT DOCUMENTS

| | | |
|---|---|---|
| JP | 2005-151525 A | 6/2005 |
| JP | 2005-223767 A | 8/2005 |
| JP | 2008-122729 A | 5/2008 |
| WO | WO 2009/009608 A2 | 1/2009 |

OTHER PUBLICATIONS

Author: IEEE Computer Society; Title: IEEE Standard for Information technology—Telecommunication and information exchange between systems—Local and Metropolitan Area network-Specific requirements Part11: Wireless LAN Medium Access Control (MAC) and Physical Layer (PHY) Specifications (Edition: IEEE Std 802.11 2007); Date 2007; Publisher: IEEE.

Aug. 18, 2010, European Search Report issued for related EP application No. 10 25 0204.

Nov. 4, 2016, European communication issued for related EP application No. 16178811.2.

Nov. 28, 2016, Chinese communication issued for relate CN application No. 201310635208.6.

Apr. 20, 2018, European Search Report issued for related EP Application No. 18152372.1.

\* cited by examiner

WIRELESS COMMUNICATION DEVICE, WIRELESS COMMUNICATION SYSTEM, WIRELESS COMMUNICATION METHOD AND PROGRAM

CROSS REFERENCE TO PRIOR APPLICATION

This application is a continuation of U.S. patent application Ser. No. 13/780,997 (filed on Feb. 28, 2013), which is a continuation of U.S. patent application Ser. No. 12/750,346 (filed on Mar. 30, 2010), which claims priority to Japanese Patent Application No. 2009-094369 (filed on Apr. 8, 2009), which are all hereby incorporated by reference in their entirety.

BACKGROUND OF THE INVENTION

Field of the Invention

The present invention relates to a wireless communication device, a wireless communication system, a wireless communication method, and a program.

Description of the Related Art

In recent years, due to advantages such as a greater degree of freedom of devices or the like, a wireless network typified by IEEE 802.11, which is a LAN standard, is becoming more popular, taking the place of a wired network, and applications that are used are becoming more varied.

CITATION LIST

Patent Literature

[Patent Literature 1] JP-A-2005-223767
[Patent Literature 2] JP-A-2005-151525
[Patent Literature 3] JP-A-2005-51522

SUMMARY OF THE INVENTION

In the infrastructure mode of IEEE 802.11, the operation of an access point (AP) is started first, and notification information (beacon) is periodically transmitted from the access point at a frequency that is set in advance. A station (STA) finds the access point, which is a communication counterpart, by receiving the beacon transmitted from the access point.

On the other hand, a method is assumed of determining an access point and a station by negotiation after connection has been completed, without distinguishing in advance an access point and a station among communicating devices. According to this method, since it is not known at what frequency the counterpart is operating, notifications, such as beacons, are transmitted while switching the frequencies, and when the frequencies of devices match at a certain timing, the notification information can be received for the first time and connection can be completed.

However, in this case, if frequency switching timing of a device matches that of a communication-counterpart device, a situation is assumed where switching progresses with the frequency of the devices remaining different and notification information transmitted from a communication counterpart will not be received.

In light of the foregoing, it is desirable to provide a wireless communication device, a wireless communication system, a wireless communication method, and a program which are novel and improved, and which enable to reliably look for a communication counterpart while switching frequencies.

According to an embodiment of the present invention, there is provided a wireless communication device which includes a notification information transmitting unit for transmitting, via a wireless communication network, notification information of the wireless communication device, a notification information receiving unit for receiving notification information transmitted from another device, a frequency switching unit for successively switching, at random cycles, a frequency at which the notification information is transmitted or a frequency at which the notification information is received, and a transmission processing unit for performing a data transmission process after transmitting or receiving an acknowledgement to the notification information to/from such other device Transmission of the notification information by the transmitting unit and waiting for receipt of the notification information by the receiving unit may be performed in time-division manner. There may be provided a random period setting unit for setting a cycle for transmitting the notification information or a waiting cycle for the receipt of the notification information to a random period.

There may be provided an acknowledgement transmitting unit for transmitting, in case the notification information transmitted from another device is received by the notification information receiving unit, the acknowledgement to such other device.

There may be provided a reception processing unit for receiving the acknowledgement to the notification information of the wireless communication device from another device which has received the notification information of the wireless communication device.

Transmission of the notification information by the transmitting unit may be performed at a determined specific frequency.

Reception of the notification information by the receiving unit may be performed at a determined specific frequency.

The transmitting unit may transmit a beacon as the notification information, and the receiving unit may receive an acknowledgement to the beacon transmitted as the notification information.

The transmitting unit may transmit a probe request as the notification information, and the receiving unit may receive a probe response to the probe request transmitted as the notification information.

According to another embodiment of the present invention, there is provided a wireless communication system which includes a first wireless communication device including a first notification information transmitting unit for transmitting, via a wireless communication network, notification information of the first wireless communication device, a first notification information receiving unit for receiving notification information transmitted from another device, a first frequency switching unit for successively switching, at random cycles, a frequency at which the notification information is transmitted or a frequency at which the notification information is received, and a first transmission processing unit for performing a data transmission process after transmitting or receiving an acknowledgement to the notification information to/from such other device, and a second wireless communication device including a second notification information transmitting unit for transmitting, via the wireless communication network, notification information of the second wireless communication device, a second notification information receiving unit for receiving notification information transmitted from another device, a second frequency switching unit for successively switching, at random cycles, a frequency at which the notification information is transmitted or a frequency at which the notification information is received, and a second transmission processing unit for performing a data transmission process after transmitting or receiving an acknowledgement to the notification information to/from such other device. The second wireless communication device may receive the notification information transmitted from the first wireless communication device, transmit the acknowledgement to the first wireless communication device, and perform the data transmission process with the first wireless communication device.

According to another embodiment of the present invention, there is provided a wireless communication method which includes the steps of transmitting, via a wireless communication network, notification information of a wireless communication device, waiting for notification information transmitted from another device, successively switching, at random cycles, a frequency at which the notification information is transmitted or a frequency at which the notification information is received, and performing a data transmission process after transmitting or receiving an acknowledgement to the notification information to/from such other device.

According to another embodiment of the present invention, there is provided a program for causing a computer to function as means for transmitting, via a wireless communication network, notification information of a wireless communication device, means for receiving notification information transmitted from another device, means for successively switching, at random cycles, a frequency at which the notification information is transmitted or a frequency at which the notification information is received, and means for performing a data transmission process after transmitting or receiving an acknowledgement to the notification information to/from such other device.

According to the embodiments of the present invention described above, there can be provided a wireless communication device, a wireless communication system, a wireless communication method, and a program which are novel and improved, and which enable to reliably look for a communication counterpart while switching frequencies.

DETAILED DESCRIPTION OF THE EMBODIMENT(S)

Figure 1:
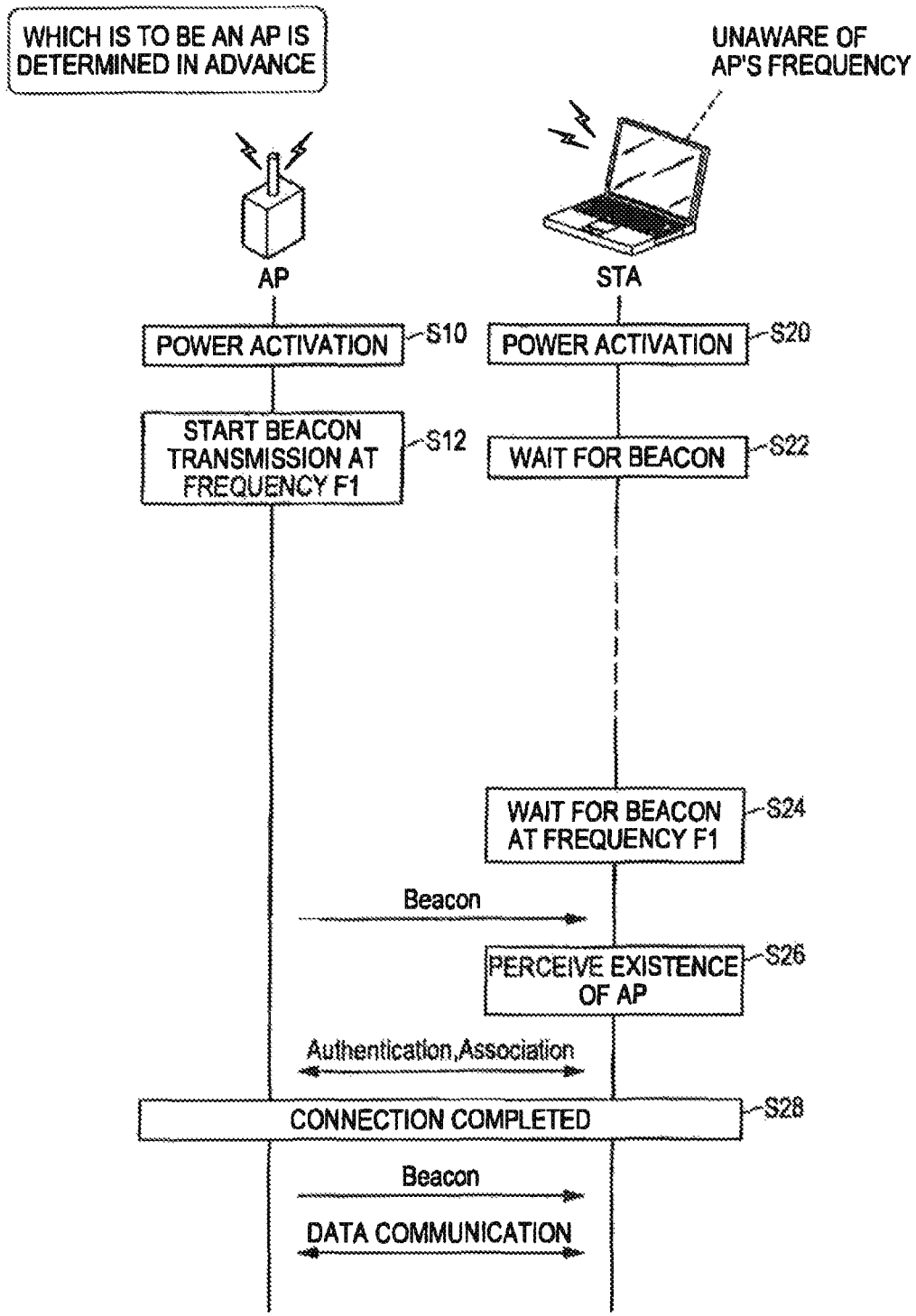
FIG. 1 is a sequence diagram showing a flow of a sequence until communication is started between an access point and a station, in the infrastructure mode of IEEE 802.11.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be given in the following order.
<1. First Embodiment>
(1) Technical Basis
(2) Communication Method where Access Point is Not Determined in Advance and Its Demerit
(3) Configuration of Wireless Communication Device
(4) Flow of Processes according to First Embodiment
<2. Second Embodiment>
(1) Flow of Processes according to Second Embodiment 1. First Embodiment (1) Technical Basis Most of the wireless LAN connection modes defined by IEEE 802.11, which is a wireless LAN standard, are an infrastructure mode of performing communication via an access point. At the time of connecting wirelessly, a radio has to somehow find a connection counterpart. To find here means to be in a state where synchronization of frequency channels and timings can be established.

In the infrastructure mode of IEEE 802.11, the operation of an access point (AP) is started first, and a beacon is periodically transmitted at a frequency (referred to as F1) that is set in advance. Here, the beacon is notification information including an ESS-ID, which is an identifier of a network, a time stamp, which is time information in the network, a list of supported wireless transmission rates, or the like. A station (STA) finds the access point (AP), which is a communication counterpart, by receiving the beacon transmitted from the access point. At this time, the frequency of the station (STA) may be t by a user to be the same as the frequency F1 of the access point (AP). Alternatively, the frequency of the station (STA) may be set such that the station continues reception while switching the frequency channels defined by IEEE 802.11 one by one until the station detects the beacon.

FIG. 1 is a sequence diagram showing a flow of a sequence until communication is started between an access point and a station, in the infrastructure mode of IEEE 802.11. First, the power of an access point is turned on in step S10, and the access point starts transmission of beacon at the frequency F1 in the next step S12. Additionally, the access point can autonomously find the frequency set by a user or a frequency at which an access point is vacant. After the power is turned on in step S20, the station starts waiting for a beacon in step S22. The station keeps waiting while switching frequencies.

In step S24, the frequency at which the station waits for a beacon is set to F1. Accordingly, a beacon (frequency F1) transmitted from the access point is received at the station, and in step S26, the station perceives the existence of the access point.

Then, authentication and association are performed between the access point and the station, and connection is completed in step S28. After the connection is completed, a beacon is transmitted from the access point to the station, and data communication between the access point and the station is started.

(2) Communication Method where Access Point is not Determined in Advance and its Demerit On the other hand, a method can be assumed according to which two 80 terminals are connected by direct connection in a simple manner by using the mechanism of IEEE 802.11 wireless LAN without the user consciously distinguishing between an access point and a station. According to this method, the terminals are equal to each other without the distinction of access point and station, and at the time of communication, both start searching for each other at the same time. Negotiation is performed after each other is found, and one plays the role of a simple access point, and the other plays the role of a station. Accordingly, this method enables to realize a simple infrastructure mode without distinguishing between an access point and a station.

According to the method described above, two terminals have to find each other simultaneously without which terminal is to play the role of starting continuous transmission of beacons (the role of the access point) being determined. At this time, the two terminals start operation while still not knowing the frequency of a counterpart and not even knowing if a counterpart exists at all. Accordingly, the two terminals have to transmit notification information while switching the frequencies, and at the same time, to wait in anticipation of reception of notification information of a counterpart.

Figure 2:
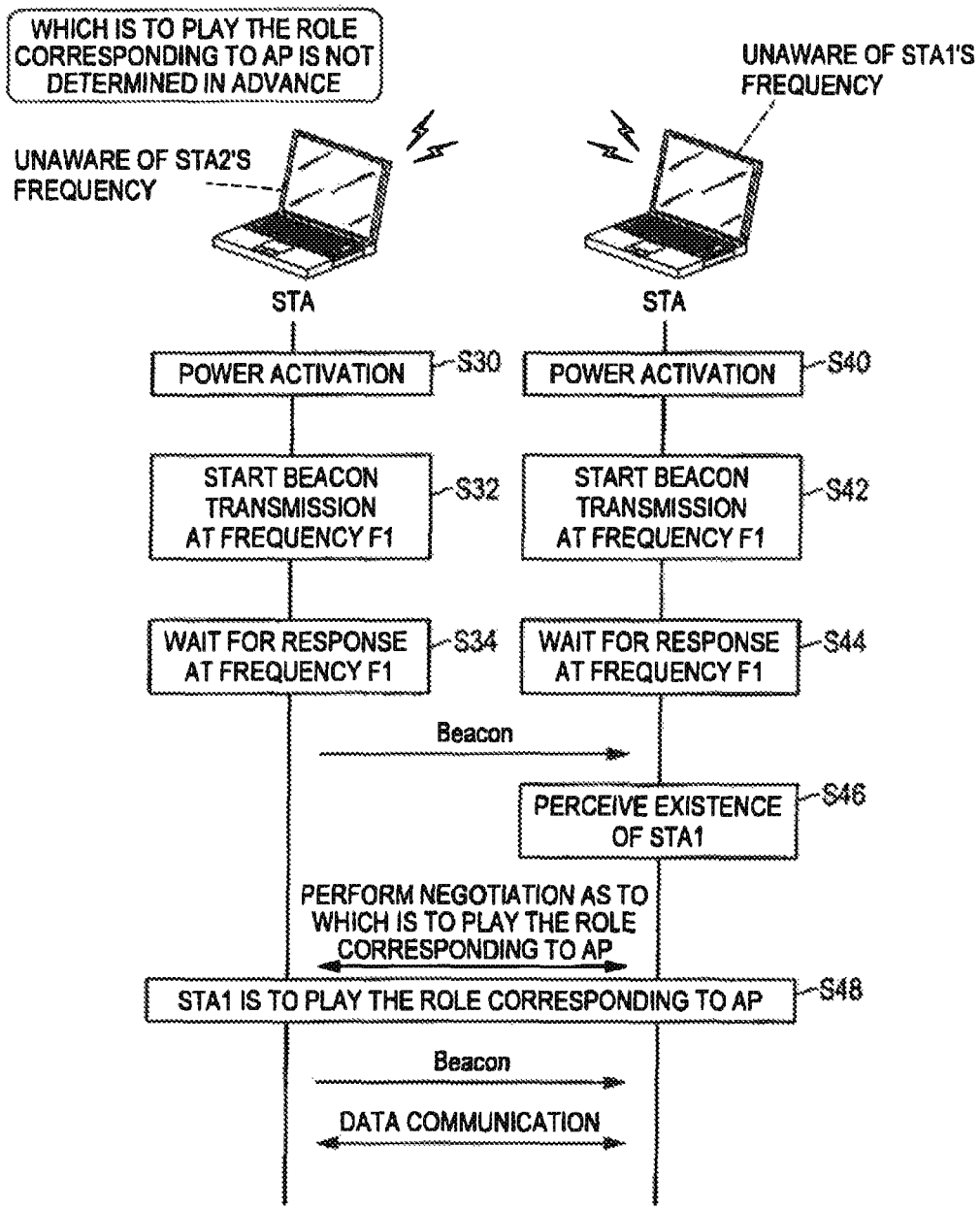
FIG. 2 is a sequence diagram showing an example of transmitting notification information by using a beacon in communication by direct connection.

FIG. 2 is a sequence diagram showing an example of transmitting notification information by using a beacon in communication by direct connection using the mechanism of IEEE 802.11 wireless LAN. First, the power of a station 1 (STA1) is turned on in step S30. In the next step S32, the station 1 transmits a beacon at the frequency F1, and after transmitting the beacon, waits, in step S34, for a response from other station at the frequency F1.

On the other hand, at a station 2 (STA2), power is turned on in step S40. In the next step S42, the station 2 transmits a beacon at the frequency F1, and after transmitting the beacon, waits, in step S44, for a response from other station at the frequency F1.

In the example of FIG. 2, the frequency F1 of the beacon transmitted by the station 1 and the frequency F1 at which the station 2 is waiting match. Accordingly, the station 2 can receive the beacon transmitted by the station 1. When receiving the beacon transmitted by the station 1, the station 2 perceives the existence of the station 1 in step S46. Then, negotiation for determining which is to play the role of an access point is performed between the station 1 and the station 2. As a result of the negotiation, it is determined in step S48 that the station 1 will play the role of an access point, and the connection is completed. In this case, the station 2 will play the role of a station (station (STA) shown in FIG. 1) in the infrastructure mode. After the connection is completed, a beacon is transmitted from the access point to the station, and data communication is performed between the access point and the station.

As described above, according to communication by direct connection using the mechanism of IEEE 802.11 wireless LAN, a simple infrastructure mode can be realized by negotiation at the time of connection, without determining in advance which device is to play the role of an access point or a station.

Figure 3:
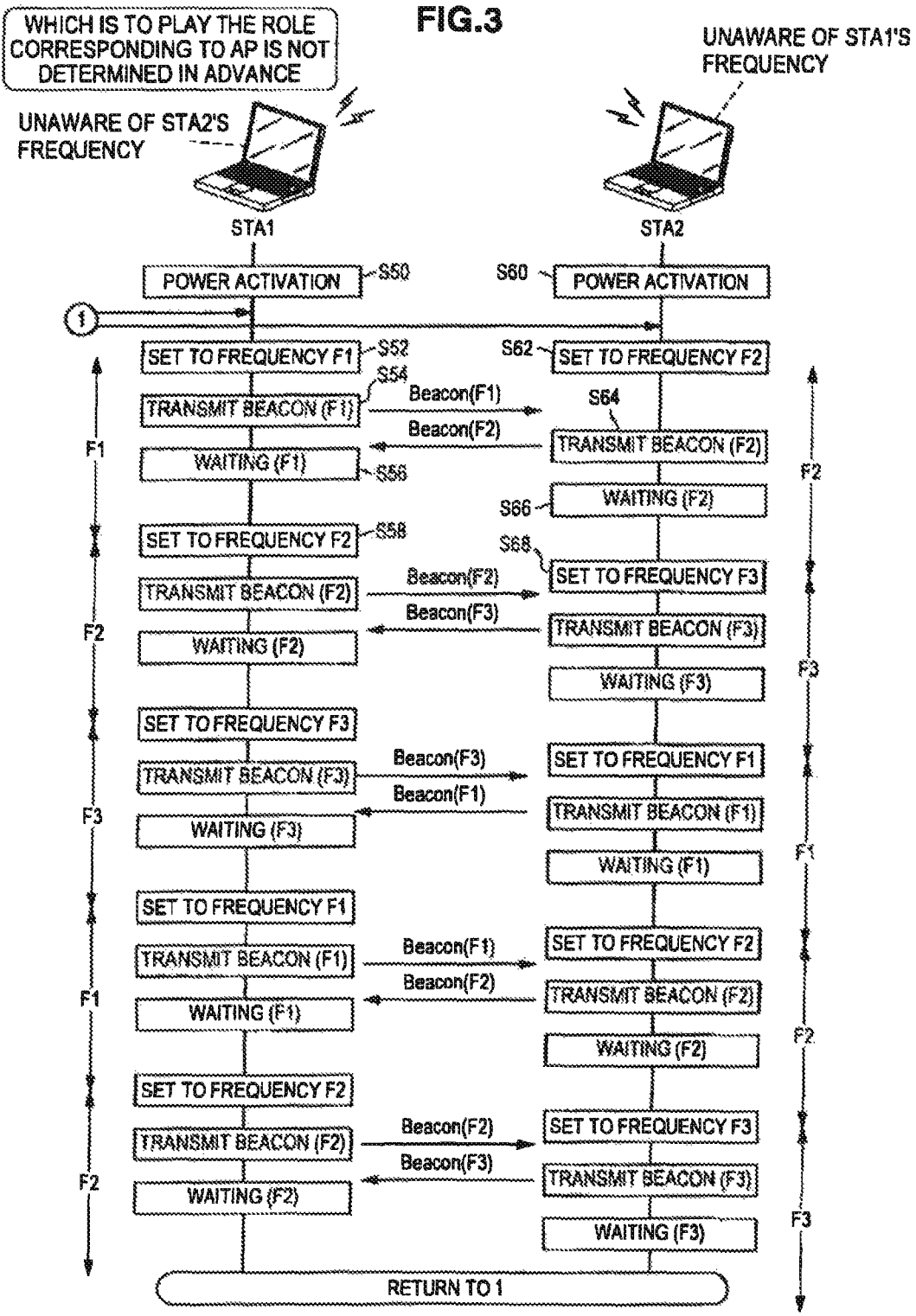
FIG. 3 is a sequence diagram showing a case where frequency change cycles of a station 1 and a station 2 match.

However, according to the communication by direct connection described above, notification information (beacons) are continuously transmitted with the frequencies continuously changing. Thus, if the frequency change cycles of the station 1 and the station 2 match, the frequencies are changed while maintaining the state where the frequencies are shifted from each other and the terminals may not find each other. FIG. 3 is a sequence diagram showing a case where frequency change cycles of the station 1 and the station 2 match.

First, when the power of the station 1 (STA1) is turned on in step S50, the station 1 sets a communication frequency to F1 in the next step S52. In the next step S54, the station 1 transmits a beacon at the frequency F1, and after transmitting the beacon, waits, in step S56, for a response from other station at the frequency F1.

On the other hand, when the power of the station 2 (STA2) is turned on in step S60, the station 2 sets a communication frequency to F2 in the eat step S62. In the next step S64, the station 2 transmits a beacon at the frequency F2, and after transmitting the beacon, waits, in step S66, for a response from other station at the frequency F2.

The station 1 switches the frequency to F2 in step S58, and transmits a beacon and waits as in steps S54 to S56. Subsequently, the station 1 periodically switches the frequency in the order of F3→F1→F2→F3, and performs the same processes.

The station 2 also switches the frequency to F3 in step S68, and transmits a beacon and waits as in steps S64 to S66. Subsequently, the station 2 periodically switches the frequency in the order of F1→F2→F3→F1, and performs the same processes.

Figure 4:
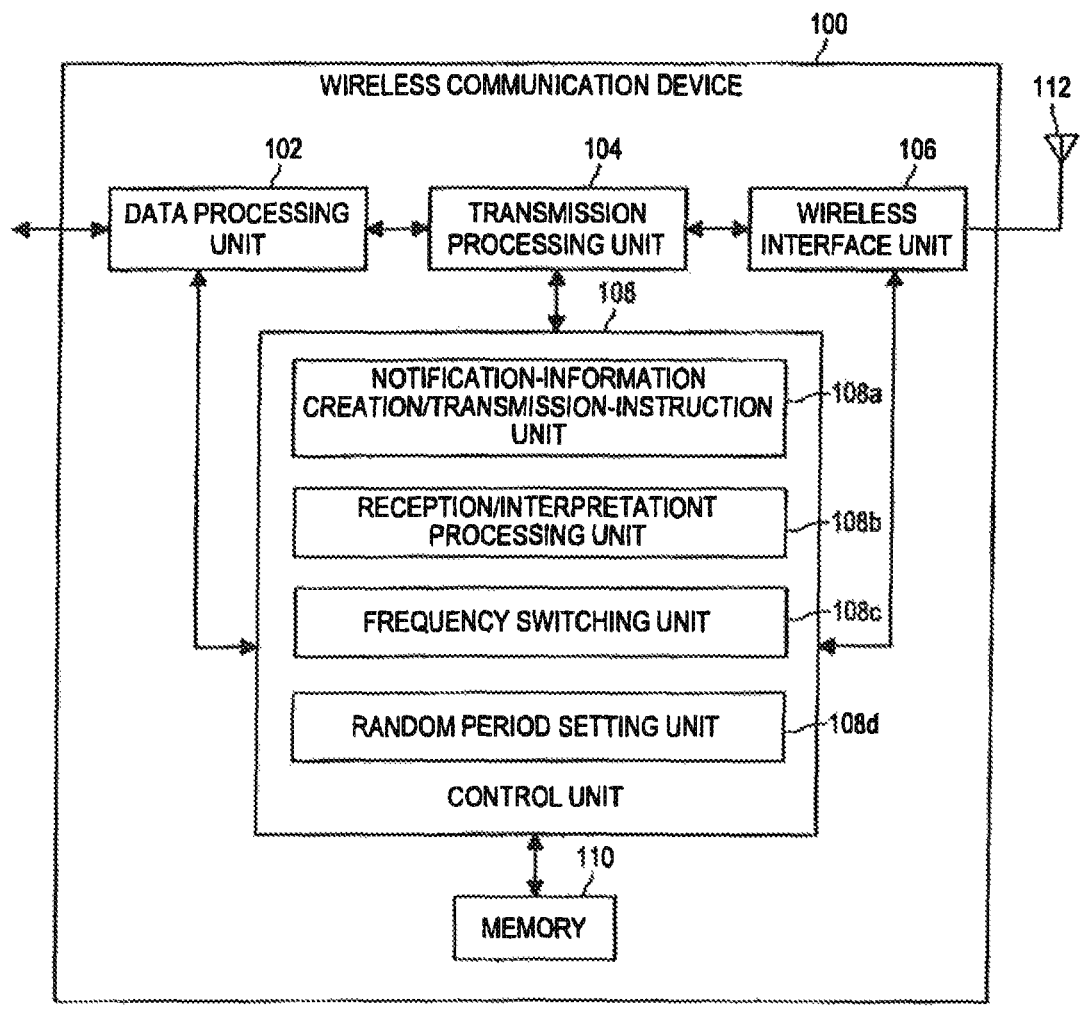
FIG. 4 is a block diagram showing an example of the configuration of a wireless communication device according to each embodiment of the present invention.

In FIG. 3, when the station 1 transmits a beacon at the frequency F1 (step S54) and is waiting at the frequency F1 (S56), the station 2 transmits a beacon at the frequency F2 (step S64) and is waiting at the frequency F2 (step S66). Therefore, neither the station 1 nor the station 2 can perceive the other because their respective frequencies are different. Also, in FIG. 3, the frequency switching cycle is the same for the station 1 and the station 2. Thus, even if each of the stations 1 and 2 switches the frequency after step S58 at S68, the frequency at which the station 1 performs transmission and the frequency at which the station 2 is waiting will not match. Also, the frequency at which the station 2 performs transmission and the frequency at which the station 1 is waiting will not match. Therefore, both station 1 and station 2 will not perceive each other (3) Configuration of Wireless Communication Device FIG. 4 is a block diagram showing an example of the configuration of a wireless communication device 100 according to each embodiment of the present invention. The wireless communication device 100 is configured to be able to communicate with other wireless communication device by a wireless communication network such as IEEE 802.11a, IEEE 802.11b and IEEE 802.11n, which are wireless LAN standards. As shown in FIG. 1, each wireless communication device 100 includes a data processing unit 102, a transmission processing unit 104, a wireless interface unit 106, a control unit 108, a memory 110, and an antenna 112.

At the time of transmission, the data processing unit 102 creates various data frames and data packets in response to a request from an upper layer, for example, and supplies the same to the transmission processing unit 104. The transmission processing unit 104 performs, at the time of transmission, processing such as adding to a packet generated at the data processing unit 102 various data heads or an error detection code such as a frame check sequence (FCS), and provides the data which has been processed to the wireless interface unit 106. The wireless interface unit 106 generates, from the data received from the transmission processing unit 104, a modulation signal in a frequency band of a carrier, and makes the same transmitted from the antenna 112 as a radio signal.

Furthermore, at the time of performing a reception operation, the wireless interface unit 106 decodes the various data frames by down-converting the radio signal received by the antenna 112 and changing the same to a bit sequence. That is, the wireless interface unit 106 can function, in cooperation with the antenna 112, as a transmitting unit and a receiving unit. The transmission processing unit 104 analyzes the headers added to the various data frames supplied from the wireless interface unit 106 and checks, based on the error detection code, that each data frame includes no error, and then, supplies the various data frames to the data processing unit 102. The data processing unit 102 processes and analyzes the various data frames and data packets supplied from the transmission processing unit 104.

The control unit 108 is a block for controlling the respective operations of the data processing unit 102, the transmission processing unit 104, and the wireless interface unit 106. The control unit 108 performs operations such as determination of a transmission frequency, creation of a control message (notification information such as a beacon, a beacon acknowledgement, a probe request and a probe response), issuance of a transmission command for the control message, and interpretation of the control message. Also, the control unit 108 controls various operations of the wireless communication device 100, such as reception operation and transmission operation.

As shown in FIG. 4, the control unit 108 includes, as main structural elements, a notification-information creation/transmission-instruction unit 108a, a option/interpretation processing unit 108b, a frequency switching unit 108c, and a random period setting unit 108d. The notification-information creation/transmission-instruction unit 108a creates the control message, or issues a transmission command for the control message. The reception/interpretation processing unit 108b performs a reception process or an interpretation process for the 16 control message transmitted from the communication counterpart. The frequency switching unit 108c performs an operation of switching transmission frequencies or of switching waiting frequencies. The random period setting unit 108d performs an operation of setting a transmission cycle or a waiting cycle to a random period.

The memory 110 plays the role of a work area for the data processing by the control unit 108, and has a function of a storage medium for holding various types of data. Various storage media, for example, a volatile memory such as a DRAM, a non-volatile memory such as an EEPROM, a hard disk and an optical disk, may be used as the memory 110. Additionally, each block shown in FIG. 4 can be configured from hardware (circuit). Furthermore, each block can be configured from a processor (CPU) and software (program) for making the processor function.

In this case, the program can be stored in the storage medium included in the wireless communication device 100, such as the memory 110.

(4) Flow of Processes According to First Embodiment

Figure 5:
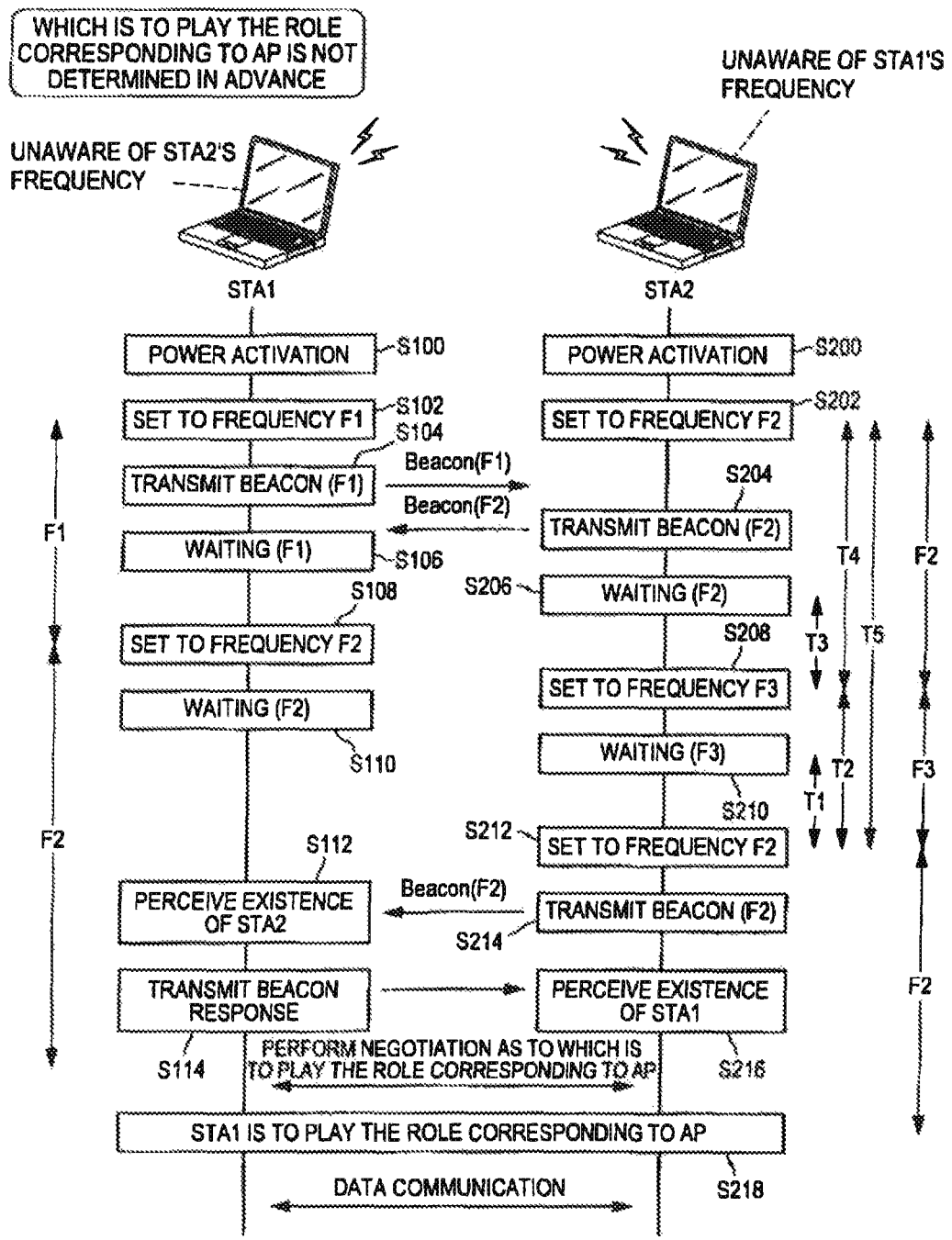
FIG. 5 is a schematic diagram showing a flow of a sequence according to a first embodiment.

The present embodiment makes the frequency change cycle inconstant (random) in view of the issue described with FIG. 3. FIG. 5 is a schematic diagram showing a flow of a sequence according to the present embodiment. As with FIG. 3, two stations (STA1 and STA2) are to look for a communication counterpart. Both stations 1 and 2 are assumed to have a function conforming to IEEE 802.11. Also, as with FIG. 3, usable frequencies are F1, F2 and F3 for both stations 1 and 2.

There are two kinds of messages to be transmitted by each of the station 1 and the station 2, namely, a beacon and a beacon acknowledgement which is transmitted at the time of receiving a beacon. Also, there are four states in relation to the states of each of the station 1 and the station 2, namely, beacon transmission, waiting, frequency changing, and beacon response transmission.

In FIG. 5, the station 1 is to transmit a beacon at the frequency F1 during the beacon transmission cycle. Also, the station 2 is to transmit a beacon at the frequency F2. With both station 1 and station 2, the transmission of a beacon is to be alternately performed every 2 cycles of the frequency switching cycles and waiting is to be performed every cycle.

First, when the power of the station 1 (STA1) is turned on in step S100, the station 1 sets a communication frequency to F1 in the next step S102. In the next step S104, the station 1 transmits a beacon at the frequency F1, and after transmitting the beacon, waits, in step S106, for a response from other station at the frequency F1.

On the other hand, at the station 2 (STA2), when the power is turned on in step S200, a communication frequency is set to F2 in the next step S202. In the next step S204, the station 2 transmits a beacon at the frequency F2, and after transmitting the beacon, waits, in step S206, for a response from other station at the frequency F2.

Then, in step S208, the station 2 sets the frequency to F3. Since the transmission of a beacon is performed every 2 cycles of the frequency switching cycles, the station 2 waits without transmitting a beacon at the frequency F3 (step S210). Then, the frequency is switched to F2 in step S212, and a beacon is transmitted at the frequency F2 in the next step S214.

The station 1 changes the frequency to F2 in step S108. Since, also at the station 1, the transmission of a beacon is performed every 2 cycles of the frequency switching cycles, the station 1 waits without transmitting a beacon at the frequency F2 (S110). Thus, the transmission timing of a beacon (frequency F2) by the station 2 in step S214 is during the time the station has started to wait (frequency F2) in step S110 and is still waiting at the frequency F2. This is because, in this case, steps S212 and S214 of the station 2 occurred before the timing of the station 1 changing the frequency after step S108, because the cycle of the station 1 for changing the frequency after step S108 was set to be random. Therefore, the station 1 receives the beacon transmitted from the station 2 at the frequency F2, perceives the existence 16 of the station 2 in step S112, and transmits a beacon response in the next step S114.

The station 2 receives the beacon response transmitted from the station 1 and perceives the existence of the station 1 in step S216. Then, negotiation is performed between the station 1 and the station 2 to determine which is to play the role of an access point. Here, it is assumed that, as a result of the negotiation, the station 1 is determined to play the role of an access point in the infrastructure mode (step S218), and the connection is completed. In this case, the station 2 will play the role of a station in the infrastructure mode. After the connection is completed, data communication is performed between the station 1 and the station 2.

In the sequence of the present embodiment shown in FIG. 5, the cycle for transmitting beacons, the cycle for waiting, or the cycle for changing the frequencies is set to a random period for each of the stations 1 and 2. Referring to the station 2 as an example, a time T1 from a timing of starting the waiting at the frequency F3 (step S210) to a timing of changing to the frequency F2 (step S212) can be set as the random period. Also, a time T2 from a timing of setting to the frequency F3 (step S208) to a timing of changing to the next frequency F2 (step S212) can be set as the random period Also, in case of the cycle for waiting after the transmission of a beacon, a time T3 from a timing of transmitting a beacon at the frequency F2 and of starting to wait (step S206) to a timing of changing to the next frequency F3 (step S208) can be set as the random period.

Also, a time T4 from setting the transmission frequency for a beacon to F2 (step S202) to a timing of changing to the next frequency F3 (step S208) can be set as the random period.

Also, a portion equivalent to 2 cycles of the frequency switching cycles may be set as the random period. For example, a time T5 from setting the transmission frequency for a beacon to F2 (step S202) to a net timing of setting the transmission frequency for a beacon to F2 (step S212) may be set as the random period.

In this manner, by setting the cycle for transmitting beacons, the cycle for waiting, or the cycle for changing the frequencies at a random period, frequencies can be prevented from being switched at the same cycles at both station 1 and station 2. Accordingly, a state as described with FIG. 3 in which the terminals will not find each other can be reliably prevented.

The random period may be period generated by a random number generator, for example. By ending a waiting state at a certain frequency at a timing of elapse of a random period and switching to the next frequency, a situation as described in FIG. 3 where devices will not find each other can be reliably prevented.

Additionally, in FIG. 5, it is assumed that the transmission of a beacon is performed every 2 cycles of the frequency switching cycles at each of the stations 1 and 2. However, as with FIG. 3, the transmission of a beacon and waiting can be performed every cycle. In this case, the transmission frequency for a beacon can also be changed every cycle as with FIG. 3.

Additionally although beacons are transmitted at a constant frequency at all times in FIG. 5, the beacons may be transmitted at periodically different frequencies (for example, F1→F2→F3→F1, . . . ).

2. Second Embodiment (1) Flow of Processes According to Second Embodiment

Next, the second embodiment of the present invention will be described. The configuration of a wireless communication device 100 according to the second embodiment is the same as that of the first embodiment described with FIG. 4. The waiting time for receiving a beacon was made random in the first embodiment. However, in the second embodiment, a cycle for transmission or a cycle for waiting is set to a random period in case of receiving a probe response as a response to a probe request. The probe request here is notification information including an identifier of a network, supported communication rte information, identification information of each station, or the like.

In the second embodiment, there are two kinds of messages to be transmitted by each of the station 1 and the station 2, namely, a probe request and a probe response. Also, there are four states in relation to the states of each of the station 1 and the station 2, namely, probe request transmission, waiting, frequency changing, and probe response transmission.

Figure 6:
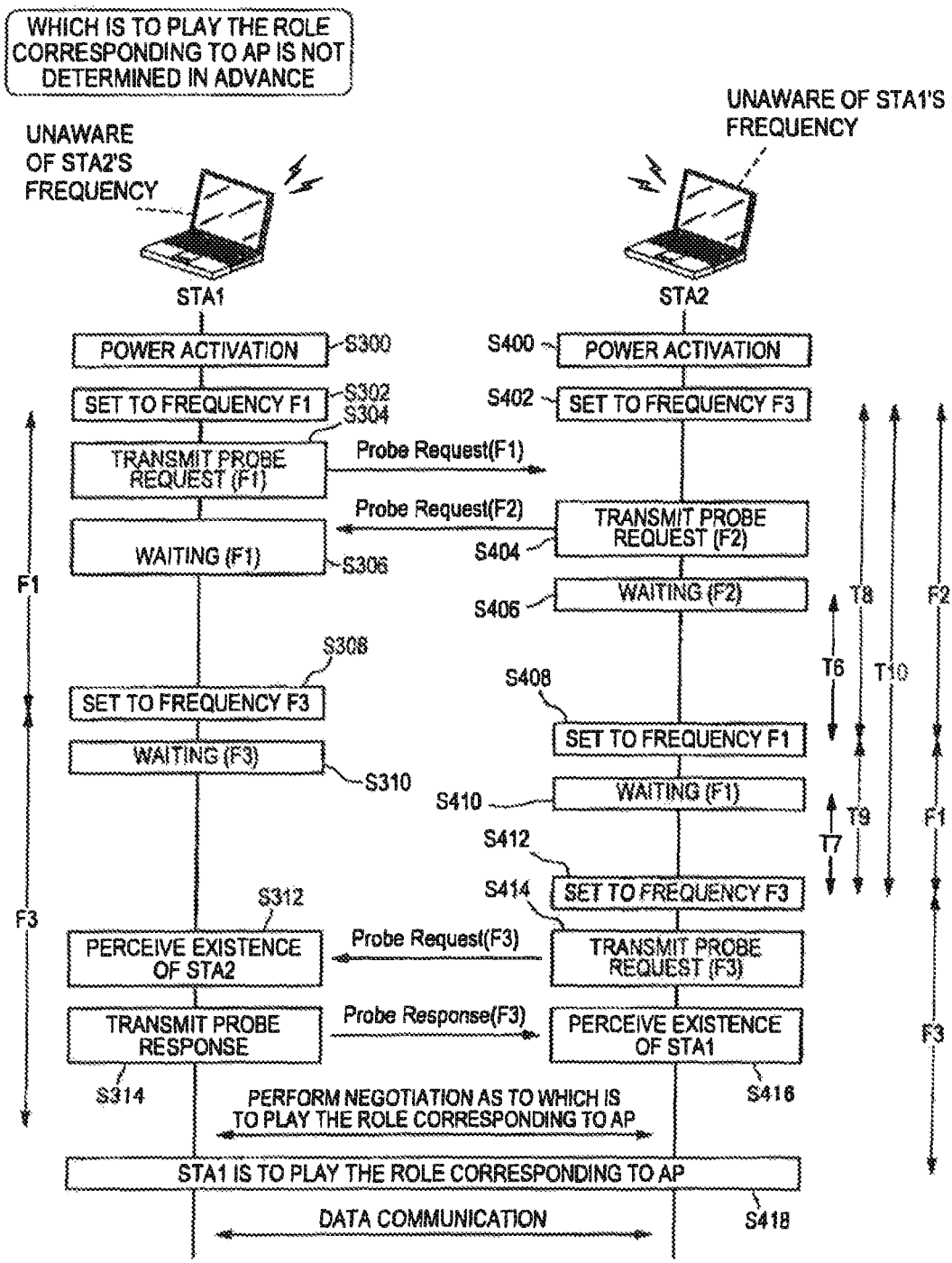
FIG. 6 is a schematic diagram showing a flow of a sequence according to a second embodiment.

FIG. 6 is a schematic diagram showing the flow of processes. It is assumed that, for both the station 1 and the station 2, the transmission of a probe request is performed every 2 cycles of the frequency switching cycles and waiting is performed every cycle.

First, when the power of a station 1 (STA1) is turned on in step S300, the station 1 sets a communication frequency to F1 in the next step S302. In the next step S304, the station 1 transmits a probe request at the frequency F1. Then, after transmitting the probe request, the station 1 waits, in step S306, for the reception of a probe response to the probe request that has been transmitted.

On the other hand, when the power of a station 2 (STA2) is turned on in step S400, a communication frequency is set to F3 in the next step S402. The station 2 transmits a probe request at a frequency F2 in the next step S404. Then, after transmitting the probe request, the station 2 waits, in step S406, for a probe response to the probe request that has been transmitted.

Then, in step S408, the station 2 sets the frequency to F1, and waits for a probe request at the frequency F1 in step S410. Then, in step S412, the frequency is switched to F3, and a probe request is transmitted at the frequency F3 in the next step S414.

The station 1 changes the frequency to F3 in step S308, starts waiting for a probe request at the frequency F3 in the next step S310, and will keep waiting. Then, the transmission timing of a probe request (frequency F3) by the station 2 in step S414 matches the timing of the station 1 waiting (frequency F3), after step S310, for a probe request. This is because, in this case, steps S412 and S414 of the station 2 occurred before the timing of the station 1 changing the frequency after step S308, because the cycle of the station 1 for changing the frequency after step S308 was set to be random. Therefore, the station 1 receives the probe request transmitted from the station 2 at the frequency F3, perceives the existence of the station 2 in step S312, and transmits a probe response in the next step S314.

The station 2 receives the probe response transmitted from the station 1 and perceives the existence of the station 1 in step S416. Then, negotiation is performed between the station 1 and the station 2 to determine which is to play the role of an access point. Here, it is assumed that, as a result of the negotiation, the station 1 is determined to play the role of an access point in the infrastructure mode (step S418), and the connection is completed. In this case, the station 2 will play the role of a station in the infrastructure mode. After the connection is completed, data communication is performed between the station 1 and the station 2.

Also in the sequence of the embodiment shown in FIG. 6, the waiting time is set to a random period for both station 1 and station 2. Referring to the station 2 as an example, any of T6 to T11 shown in FIG. 6 or some of T6 to T11 can be made to be the random period.

In the present embodiment in case of transmitting a probe request, it is assumed for both station 1 and station 2 that the probe request is transmitted with usable frequencies periodically switched in turn. In FIG. 6, the station 1 switches the frequency in the order such as F1→F2→F3→F1 . . . , and the station 2 switches the frequency in the order such as F2→F3→F1→F2 . . . .

On the other hand, since the counterpart is transmitting probe requests while switching the frequencies, a probe request is to be waited for at a constant frequency. In the example of FIG. 6, the station 1 waits for probe request at the frequency F3, and the station 2 waits for a probe request at the frequency F1. However, the waiting frequency may be periodically differing frequencies, and may be switched in the order of F1→F2→F3→F1 . . . , for example.

As described above, according to the present embodiment, by making random the time during which a waiting state is continued, the frequencies of the devices are not set to be different at all times, and a situation where the devices will not find each other can be prevented.

It should be understood by those skilled in the art that various modifications, combinations, sub-combinations and aberrations may occur depending on design requirements and other factors insofar as they are within the scope of the appended claims or the equivalents thereof.

What is claimed is:

1. A wireless communication device comprising:
    processing circuitry configured to:
        receive, during a listen state, a probe request from a second device on a first frequency that is fixed in a first state of waiting on the fixed first frequency as a single fixed channel of receiving the probe request;
        transmit, during a search state, a probe request to the second device in a second state of sending the probe request on plural channels of a fixed list of frequencies, the probe request being transmitted for each of the first frequency, a second frequency, and a third frequency switched in turn, the probe request also being transmitted after each occurrence of the switching and within a single duration of the search state;
        cycle the first state and the second state; and
        randomize a period for which the first state is active while cycling; and
    an antenna coupled to the processing circuitry and through which the probe request to the second device is transmitted, and through which the probe request from the second device is received,
    wherein the period is a length of time that is an integer multiple of a time interval, the integer multiple being a randomly-generated number.

2. The wireless communication device according to claim 1, wherein the processing circuitry is configured to set a frequency channel of the wireless communication device to the first frequency for a duration of receiving the probe request.

3. The wireless communication device according to claim 2, wherein the duration of receiving the probe request is a time period during which the processing circuitry switches to the first frequency and waits for reception of the probe request from the second device.

4. The wireless communication device according to claim 1, wherein:
    the processing circuitry is further configured to randomize a period for the second state.

5. The wireless communication device according to claim 1, wherein the probe request that is transmitted to the second device includes identification information of the wireless communication device.

6. The wireless communication device according to claim 1, wherein the processing circuitry is further configured to insert Frame Check Sequence in the probe request transmitted to the second device.

7. The wireless communication device according to claim 1, wherein the probe request transmitted to the second device includes at least one of an identifier of a network, a supported communication rate information, and a device name of the wireless communication device.

8. The wireless communication device according to claim 1, wherein a duration for transmitting the probe request to the second device is a time period during which the wireless communication device is in the search state and transmits one or more of the probe requests.

9. The wireless communication device according to claim 1, wherein the period represents a waiting cycle for the reception of the probe request, and the waiting cycle associated with the first frequency is ended at a timing of elapse of the randomized period.

10. The wireless communication device according to claim 1, wherein in response to receiving the probe request from the second device in the first state, the processing circuitry is configured to transmit a probe response to the second device for the first frequency.

11. A method of communication implemented in a wireless communication device, the method comprising:
    receiving, through an antenna of the wireless communication device and during a listen state, a probe request from a second device on a first frequency that is fixed in a first state of waiting on the fixed first frequency as a single fixed channel of receiving the probe request;
    transmitting, through the antenna of the wireless communication device and during a search state, a probe request to the second device in a second state of sending the probe request on plural channels of a fixed list of frequencies, the probe request being transmitted for each of the first frequency, a second frequency, and a third frequency switched in turn, the probe request also being transmitted after each occurrence of the switching and within a single duration of the search state;
    cycling the first state and the second state; and
    randomizing a period for which the first state is active while cycling,
    wherein the period is a length of time that is an integer multiple of a time interval, the integer multiple being a randomly-generated number.

12. The method according to claim 11, wherein a frequency channel of the wireless communication device is set to the first frequency for a duration of receiving the probe request.

13. The method according to claim 12, wherein the duration of receiving the probe request is a time period during which the wireless communication device switches to the first frequency and waits for reception of the probe request from the second device.

14. The method according to claim 11, further comprising:
    randomizing a period for the second state.

15. The method according to claim 11, wherein the probe request that is transmitted to the second device includes identification information of the wireless communication device.

16. The method according to claim 11, further comprising:
    inserting a Frame Check Sequence in the probe request that is transmitted to the second device.

17. The method according to claim 11, wherein the probe request that is transmitted to the second device includes at least one of an identifier of a network, a supported communication rate information, and a device name of the wireless communication device.

18. The method according to claim 11, wherein a duration for transmitting the probe request to the second device is a time period during which the wireless communication device is in the search state and transmits one or more of the probe requests.

19. The method according to claim 11, wherein the period represents a waiting cycle for the reception of the probe request, and the waiting cycle associated with the first frequency is ended at a timing of elapse of the randomized period.

20. The method according to claim 11, wherein in response to receiving the probe request from the second device in the first state, the method comprises further transmitting a probe response to the second device for the first frequency.

* * * * *